(12) United States Patent
Kieffaber (10) Patent No.: US 11,113,358 B2
(45) Date of Patent: Sep. 7, 2021

(54) TRAINING AND SUPPORT OVERLAY MACHINE

(71) Applicant: Christopher Kieffaber, Huntley, IL (US)

(72) Inventor: Christopher Kieffaber, Huntley, IL (US)

(*) Notice: Subject to any disclaimer, the term of this patent is extended or adjusted under 35 U.S.C. 154(b) by 0 days.

(21) Appl. No.: 16/564,312

(22) Filed: Sep. 9, 2019

(65) Prior Publication Data
US 2021/0073301 A1 Mar. 11, 2021

(51) Int. Cl.
G06F 3/0482 (2013.01)
G06F 40/174 (2020.01)
G06F 16/957 (2019.01)
G06F 16/954 (2019.01)
G09B 19/00 (2006.01)

(52) U.S. Cl.
CPC .......... G06F 16/957 (2019.01); G06F 3/0482 (2013.01); G06F 16/954 (2019.01); G06F 40/174 (2020.01); G09B 19/003 (2013.01)

(58) Field of Classification Search
CPC .... G06F 16/957; G06F 16/954; G06F 40/174; G06F 3/0482; G09B 19/003
See application file for complete search history.

(56) References Cited

U.S. PATENT DOCUMENTS

| | | | |
|---|---|---|---|
| 7,240,077 B1* | 7/2007 | Edelman | G06F 16/958 |
| 2003/0192008 A1* | 10/2003 | Lee | G06F 40/174 |
| | | | 715/224 |
| 2004/0036722 A1* | 2/2004 | Warren | G06F 40/106 |
| | | | 715/866 |
| 2004/0268225 A1* | 12/2004 | Walsh | G06F 16/957 |
| | | | 715/234 |
| 2005/0091577 A1* | 4/2005 | Torres | G06F 3/04847 |
| | | | 715/225 |
| 2006/0080284 A1* | 4/2006 | Masonis | H04L 67/306 |
| 2012/0054593 A1* | 3/2012 | Naderi | G06F 40/174 |
| | | | 715/224 |

* cited by examiner

Primary Examiner — Jennifer N To
Assistant Examiner — Amy P Hoang
(74) Attorney, Agent, or Firm — Law Office of Scott C Harris, Inc (57) ABSTRACT

An online training system and support tool that overlays browser-based help pages to guide users through page navigation or processes. Each item on the page when selected can bring up an item specific help tool for that item. An administrator function can pop up to allow the administrator to edit items on the page and provide item specific help tools. In addition, the help overlay can be toggled on and off by toggling the button, where the button on the page is in one condition to show the page with no annotations, and is selected to make the tool active, and to automatically detect the user selecting a specific item and toggling that item.

10 Claims, 7 Drawing Sheets

TRAINING AND SUPPORT OVERLAY MACHINE

BACKGROUND

Users viewing a new computer page often need guidance on how to use the computer page.

Conventional ways of training people in using screens of this type include tools such "help" keys and icons, that allow users to ask questions. Screens can also be associated with training videos which demonstrate how to interact with the system.

Many training support materials are static documents that show screen shots or demonstration videos. However, these tools are typically just simulations of the actions; but not the actual page where users need the guidance during their working sessions and certainly not ON that page. Typically, existing tools are viewed side by side, and/or requiring users to navigate between on-screen and off-screen (e.g., printed) formats for carrying out the training

SUMMARY

The present application describes an on-screen training and guidance system that provides page specific instructions, and guidance about how to interact with a computer page. In one embodiment, the system provides the instructions in chronological order. In an embodiment, the guidance is overlaid on the user's working page. As users carry out various kinds of work, those users are guided on how to do the work properly, and the proper order in which the items can be done.

In an embodiment, the display can be toggled on and off using a special user button on the page.

In a similar way, an administrator button allows the administrator to assign who has access to the user button, and allows the administrator to configure the system.

In an embodiment, there is a user page, and an administrator page. The administrators can configure the kind of guidance that users are given when those access the browser page and turn on the help interface, which is toggled on and off by actuating a button on the computer user interface. Actuating the button causes web extensions to be displayed on browsers overlaid over the users screen.

BRIEF DESCRIPTION OF THE DRAWINGS

FIG. 3 shows an administrative screen layout, showing no specific text field selected;

DETAILED DESCRIPTION

Embodiments are as described herein.

The present invention describes a programmed computer, which is programmed to provide online training and support tool that is overlaid on a user page. Computer pages can be webpages, or any other kind of pages that interface with a server. In an embodiment described herein, for example, the computer page is a purchase authorization screen of a system that allows users to enter requested purchases into a computer system.

In one embodiment, the user page can be a browser-based page that has certain fields that need to be filled in. In an embodiment, the display of the help screen can be toggled on and off with the push of a button. In an embodiment, where this is on a browser-based page, and the help operations can be programmed as a plug-in to the browser, such as a Chrome, Firefox, Edge, or Safari plug in.

In one embodiment, the system can also validate when the configured fields have been properly correctly completed.

Embodiments describe collecting data of all user actions when the application is active for continuous improvement. However, the collection of data can be optional.

Figure 1:
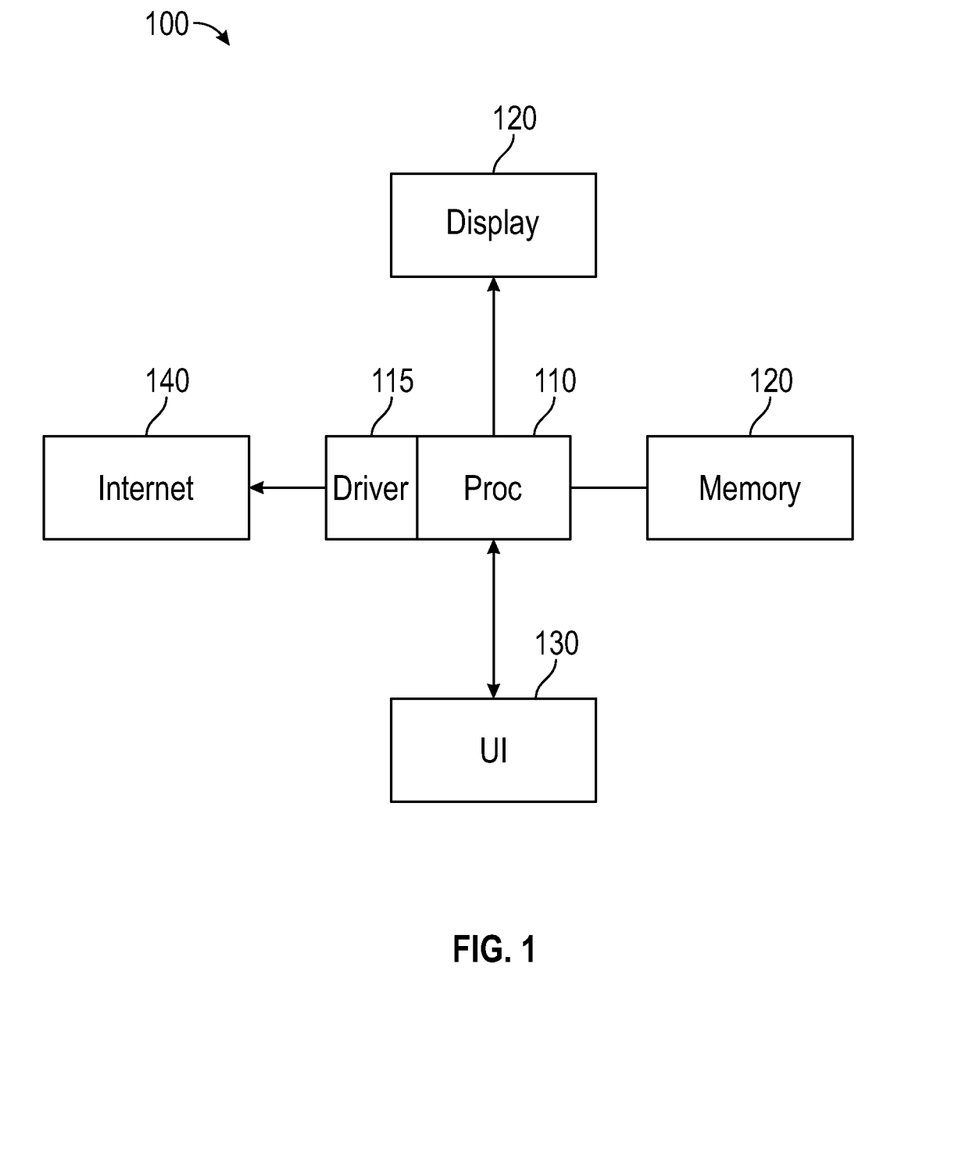
FIG. 1 shows a block diagram of the computer system.

An embodiment is shown in FIG. 1. A computer system 100 includes a processor 110 with the display driver 115 driving the display 120. The display can display any of the pages which are shown in the embodiments as described herein. The processor operates based on instructions and memory 120 which can be a hard drive, and/or any kind of RAM. The processor also communicates with the user interface 130. The processor and memory are programmed to display the information as described herein. The information may also be partly or completely received over the Internet shown as 140 which may be a Internet connection. Both the display pages and the help pages may be received over the Internet or may be locally stored.

Figure 2:
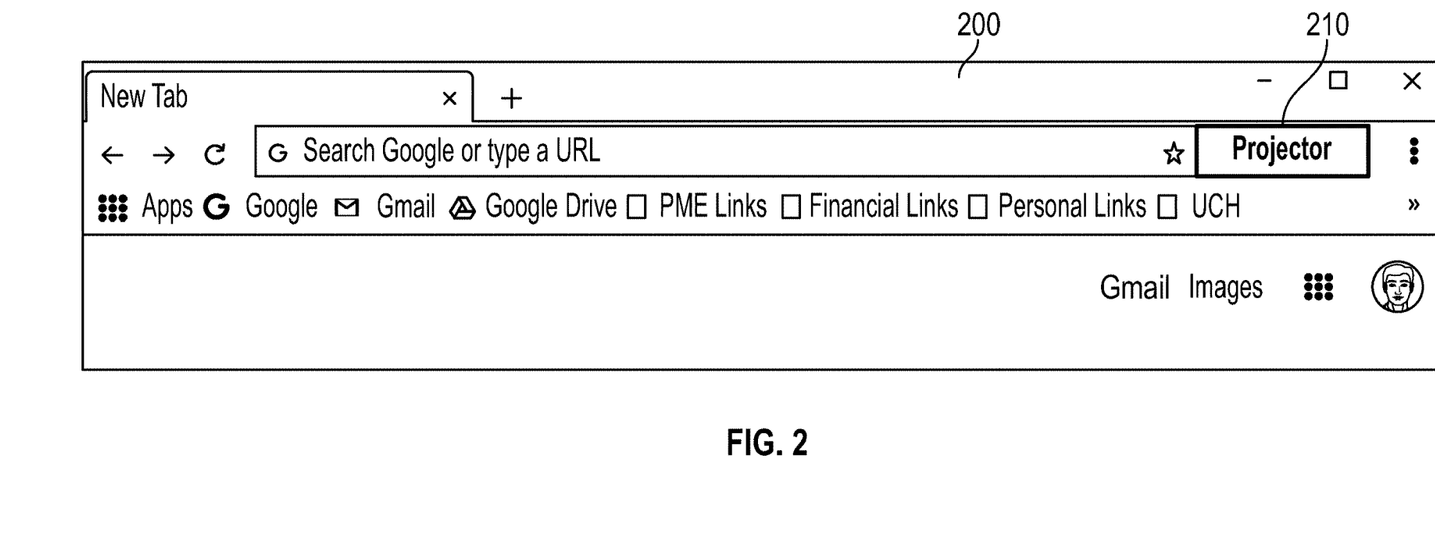
FIG. 2 illustrates the toggle button which is used to turn on and off the information.

FIG. 2 shows a display page showing an exemplary display page which will be shown to a user, here a webpage 200. The webpage 200 has a built-in add-in or widget, which displays a toggle button 210. Here the toggle button 210 is called the "projector", which can be turned on to display the help information, and can be turned off to display the regular page. This shows the different fields that can provide help. For example, in this embodiment, there are two main fields that need to be held in: the requisitioning field and the reason for ordering field. This system provides help for each of these fields. The projector button can be toggled on and off in order to obtain the help overlay shown in the figures. When the projector is on, the help overlay is provided, and the different fields to be filled in are highlighted and provide help screens. In a similar way, when a user is logged into a page as an administrator, there is a toggle button for administrator on or off which toggles the ability to edit the help overlay that is seen by others.

The explanation of what kind of information in detail is provided, as well as the way in which the system is populated with the help information, is explained with reference to the following figures, which show the administrative screen that is brought up when the user selects the administrative button in 310. FIG. 3 illustrates a sample page for a payment system that is requesting authorization to carry out a payment.

FIG. 3 shows an administrator page. If a logged in user has administrative capabilities for the specific page, they receive both the on/off toggle at 300 and also the admin toggle at 310 to enter the administrative mode. The admin toggle has been turned on at 310, hence showing the page for the admin in FIG. 3 with the help boxes to facilitate additional training.

In order to simplify the operation, the administrator mode is an assigned role that allows administrators to select specified fields, and then edit those fields to provide content to the users for a specific field. In FIG. 3, no field has been selected, and so the administrator box 320 shows the text field selected at 330 is "no selection". This is shown on the screen in FIG. 3.

However, in another embodiment, this can pop out of the browser in order to prevent screen clutter.

Figure 4:
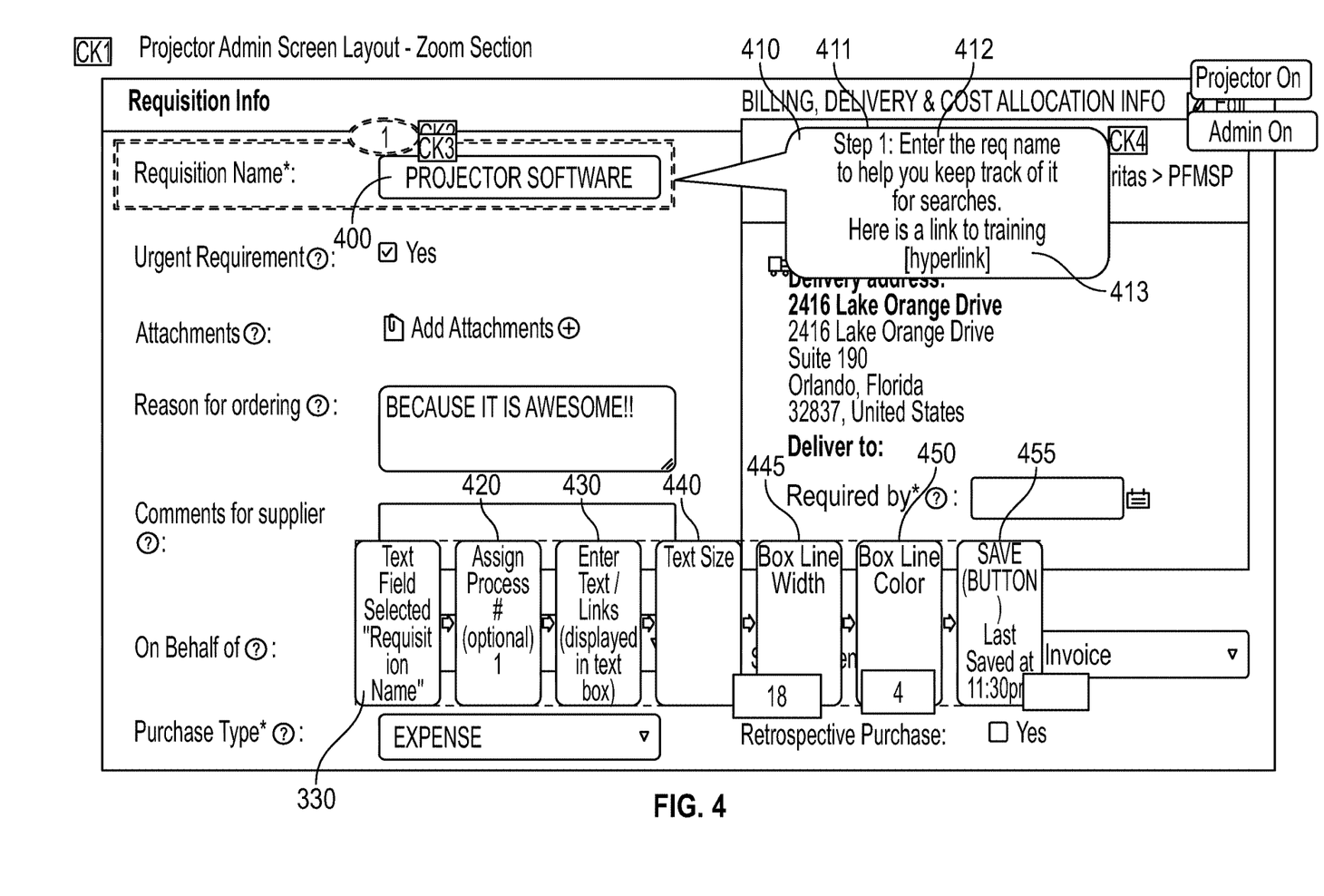
FIG. 4 shows a specific field being selected and shows the items that can associated with that field.

In FIG. 4, the administrator has entered into the first text field 330 information to assist in training for that text field. When the user selects the first text field shown as 400, here the text field saying "requisition name", the user receives a pop up as shown as 410. Here, the pop-up says "Step one" at 411, and provides information to the user that they should enter the requisition name to help keep track of it for searches. There is also a training link provided at 413, to provide additional training if the user selects it. The system allows for links or attachments to be included in the support guidance so that users can find relevant reference materials as needed. Examples include, for example, links to company policies and procedures or accounting charts, that might be helpful to fill out the forms.

Note that this shows that the text field 400 has been selected at 330. This system also provides the ability for the administrator to assign process numbers to the process, to provide an ordered list. For example in this embodiment, the requisition name should be the first data that is entered and hence the process number at 420 is assigned as number 1.

Note that assigning process numbers may be optional.

At 430, the administrator enters the data that they want to go into the text box 410. This may be the exact text that is placed in the text box, along with a hyperlink, if desired, to training. 440 sets the size of the text, 445 sets the box line width and 455 allows the administrator to save this data. Additional text and display configuration options of course, beyond those listed here are also intended to be in the scope of this embodiment.

Once saved, all users who click on the field 400 will receive this information. To clarify, the administrator sees the changes in real time as the administrator makes the changes. However, those changes are pushed out to the user profiles upon saving. The changes can be sent either on demand or on a schedule.

At 411, the system prompts the user indicating that this is step one. Note that the "1" in step 1 corresponds to the number specified in the box 420. The number in this box shows up only if the assign process number has a value. If assign process is left with no value, then there is no enforced chronological process.

Alternatively, this may support different functions, for example, if the number 2 and 3 are already taken, this may support the user adding a 2A.

This could also be a pick list, so that users can enter information out of process order, but cannot use the same number twice.

Figure 5:
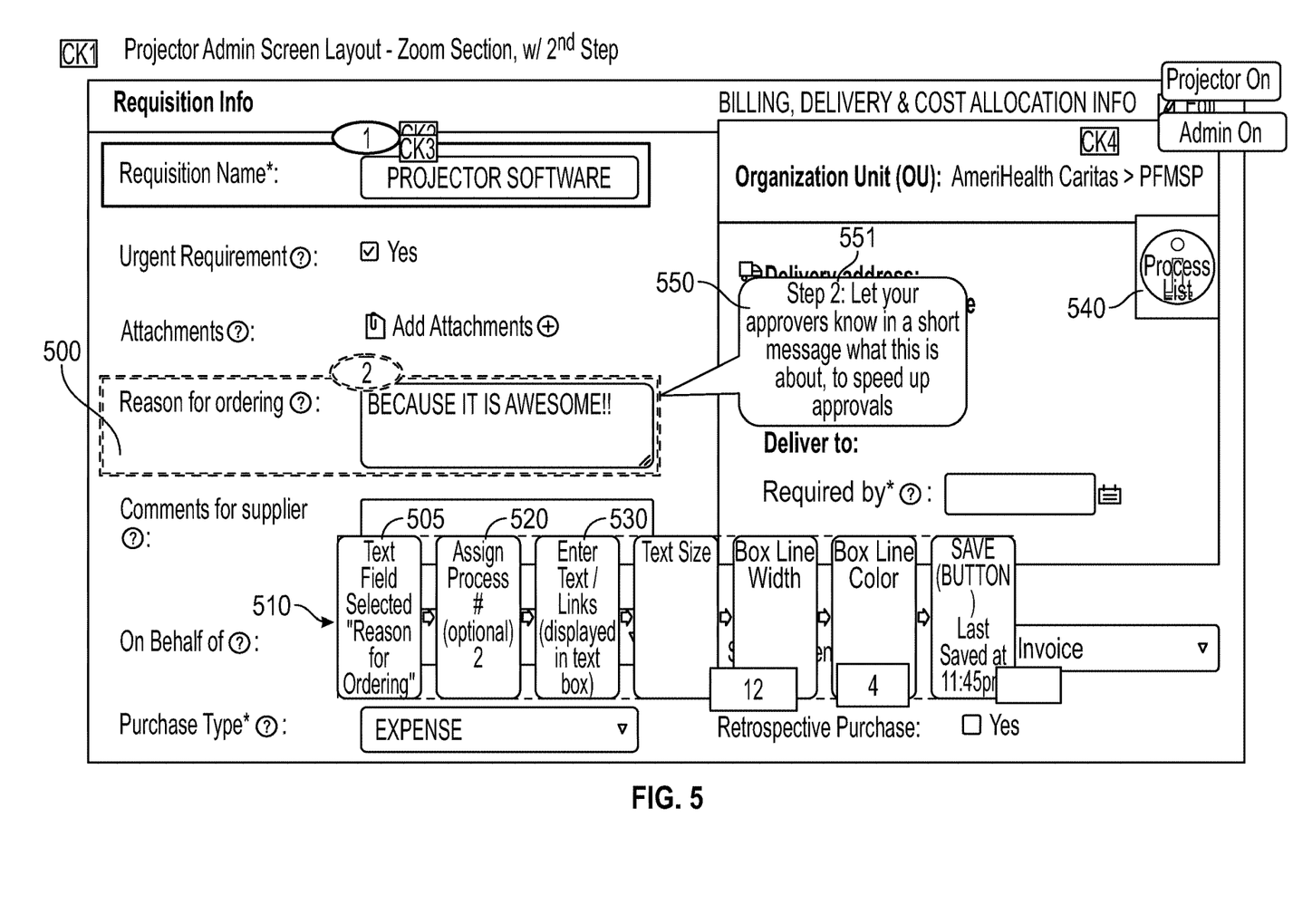
FIG. 5 shows a different field being selected.

FIG. 5 illustrates the same process for the box 500. When the administrator selects the box 500, this brings up the administrative tool 510 for the box 500, indicating at 515 that the box 500 has been selected, here "reason for ordering". Like in FIG. 4, a process number is assigned as number 2, which is also shown in as item 551 in the pop up box 515.

At 530, the user enters the text that will appear in the pop up box 5, here the text being after the step 2 "let your approvers know in a short message what this is about, to speed up approvals". In a similar way to the boxes in FIG. 4, the text size, box line box line color and save can also be modified by the administrator.

Figure 6:
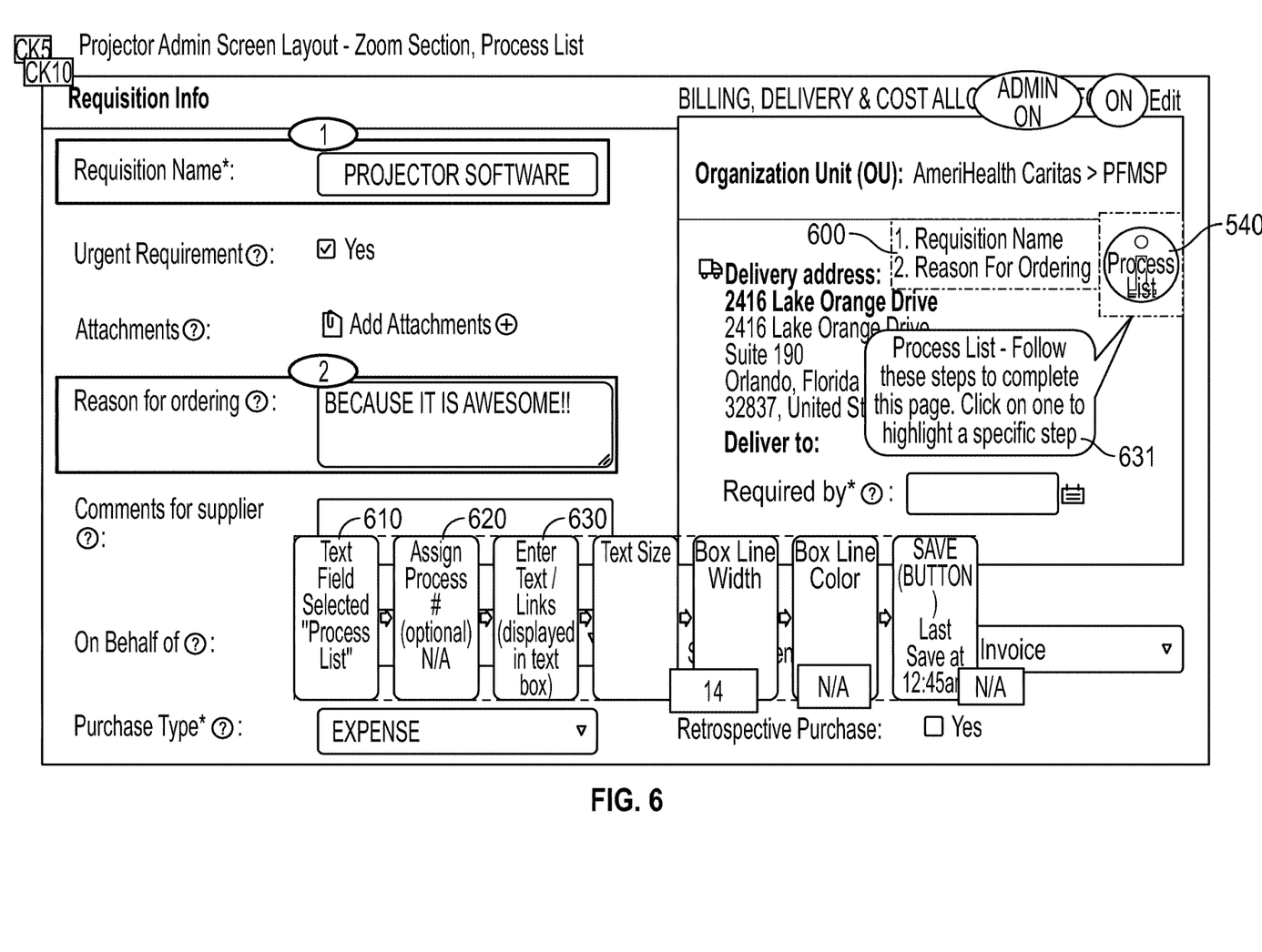
FIG. 6 shows an alternative way of getting information through a process

When there are multiple items to be processed, a process list 540 can also pop up, which can be selected by the user to provide the process list version of processing in FIG. 6.

When selecting the process list 540 as shown in FIG. 6, the pop up list 600 provides the different items that need to be selected in order to carry out an operation. The administrator can set the process list 540 in a similar way to that in which they set the other boxes.

When selecting the box 540, the text field 610 indicates that the field which is selected as the process list. Since the process list can be selected at any time, the process number for the process list, at 620 is set as N/A. The text list at 630 is set to be the data in the text box at 631 saying "process list-follow these steps to complete this page. Click on one to highlight a specific step." The user is then allowed to click on either of the steps in the box 600 in order to select the specific box in the process list, for example clicking on the box number 1 shown as 700 in FIG. 7, selects the box 1 with reference designation 400, and brings up the help box hint for the box 1 to help the user fill this out.

Figure 7:
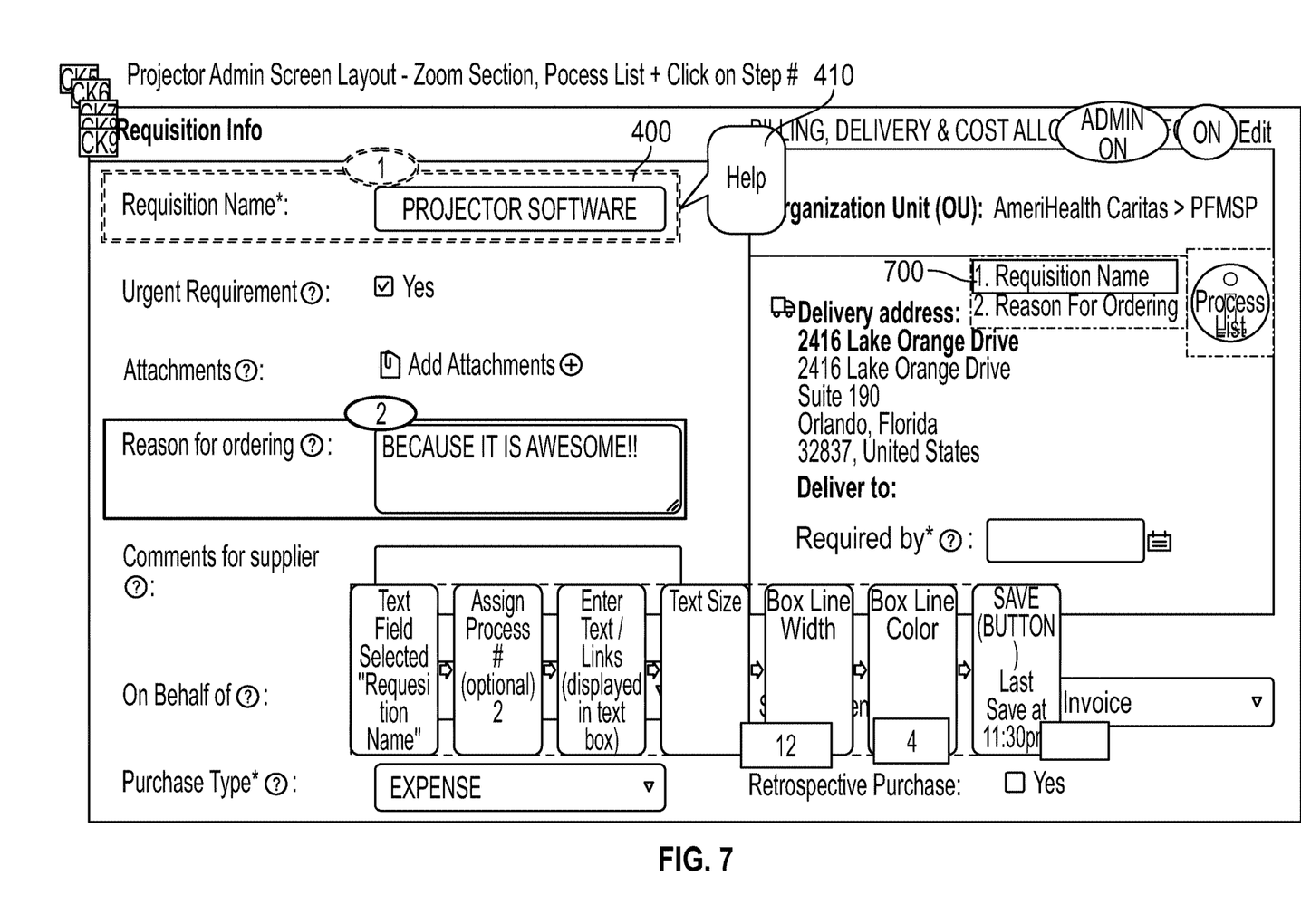
FIG. 7 shows the process list and an ordered list of numbers.

Once the number is clicked on the selected box, the selected box comes into focus by highlighting, lighting up, animating or taking some other action on the computer to indicate that the field is in focus. In another embodiment, this can just bring this box into focus in a conventional way.

In one embodiment, the items in the check in the process list can also be a checkbox, where items are checked off as they are fully completed.

Although only a few embodiments have been disclosed in detail above, other embodiments are possible and the inventors intend these to be encompassed within this specification. The specification describes certain technological solutions to solve the technical problems that are described expressly and inherently in this application. This disclosure describes embodiments, and the claims are intended to cover any modification or alternative or generalization of these embodiments which might be predictable to a person having ordinary skill in the art. For example, the part can be made of different materials.

Also, the inventor(s) intend that only those claims which use the words "means for" are intended to be interpreted under 35 USC 112, sixth paragraph. Moreover, no limitations from the specification are intended to be read into any claims, unless those limitations are expressly included in the claims.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A programmed computer, comprising:
a display;
a processor is programmed to:
 display a page on the display, where the page includes a plurality of different fields, each of the plurality of different fields being selectable, and each of the plurality of different fields requiring a response from a user,
 include a first control which is selected to switch between a first mode in which a viewer of the page sees the page and also views the plurality of different fields and in the first mode, the viewer is prompted to enter data in the plurality of different fields, and a second help mode in which the viewer of the page receives item specific help when the user selects a specific field, where the item specific help is for the specific field that is selected, and where each of the plurality of different fields includes a help item for that field, and include a second control which is selected to enter an administrative mode, in which an administrator enters information that will be displayed to a user accessing the page, where the administrative mode includes, for each of the plurality of different fields, data indicative of information to be shown to the user when that field is selected by the user, where, in the administrative mode, the administrator is prompted to optionally assign process numbers to each of the plurality of different fields, to define an ordered list based on the assigned process numbers, wherein the ordered list representing an order of operations in which the plurality of different fields must be filled in, and enforce the order of operations in which the plurality of different fields on the page are filled in according to the ordered list, and no enforcement on fields with no assigned process numbers.

2. The programmed computer as in claim 1, wherein information for the field includes text information that tells the user what to type into the field.

3. The programmed computer as in claim 1, wherein information for the field includes a training link which is actuated to obtain externally provided information about the field.

4. The programmed computer as in claim 1, wherein the first control includes a toggle button which is selected into the first mode and is selected again to put the control in the second help mode.

5. The programmed computer as in claim 4, wherein the second control also includes a selectable toggle that is selected to turn on an administrator mode in which the user can edit the item specific help, and selected again to turns off the administrator mode.

6. A method of entering data into a programmed computer, comprising:

using a processor for:

displaying a page on an electronic display, where the page includes a plurality of different fields, each of the plurality of different fields being selectable, and each of the plurality of different fields requiring a response from a user; and including a first control which is selected to switch between a first mode in which a viewer of the page sees the page and the plurality of different fields and in the first mode the user is prompted to enter data in the plurality of different fields, and a second mode in which the viewer of the page receives item specific help when the user selects a specific field, where the item specific help is for the specific field that is selected, and where each of the plurality of different fields includes a help item for that field, including a second control which is selected to enter an administrative mode, in which an administrator enters information that will be displayed to a user accessing the page, where the administrative mode includes, for each of the plurality of different fields, data indicative of information to be shown to the user when said each field is selected by the user, allowing the administrator in the administrative mode to optionally assign process numbers to each of the plurality of different fields, to define an ordered list based on the assigned process numbers, wherein the ordered list representing an order of operations in which the plurality of different fields must be filled in, and enforcing the order of operations in which the plurality of different fields on the page are filled in according to the ordered list, and no enforcement on fields with no assigned process numbers.

7. The method as in claim 6, wherein information for the field includes text information that tells the user what to type into the field.

8. The method as in claim 6, wherein information for the field includes training link which is actuated to obtain externally provided information about the field.

9. The method as in claim 6, wherein the first control includes a toggle button which is selected into the first mode and is selected again to put the control in the second help mode.

10. The method as in claim 9, wherein the second control includes a selectable toggle that is selected to turn on an administrator mode in which the user can edit the item specific help, and a second mode which turns off the administrator mode.

* * * * *